F. G. GAUNTT.
MOTOR VEHICLE HEADLIGHT.
APPLICATION FILED DEC. 18, 1919.

1,393,278.

Patented Oct. 11, 1921.

3 SHEETS—SHEET 1.

INVENTOR
F. G. Gauntt
BY Elwin M. Hulse
ATTORNEY

F. G. GAUNTT.
MOTOR VEHICLE HEADLIGHT.
APPLICATION FILED DEC. 18, 1919.
1,393,278.
Patented Oct. 11, 1921.
3 SHEETS—SHEET 2.
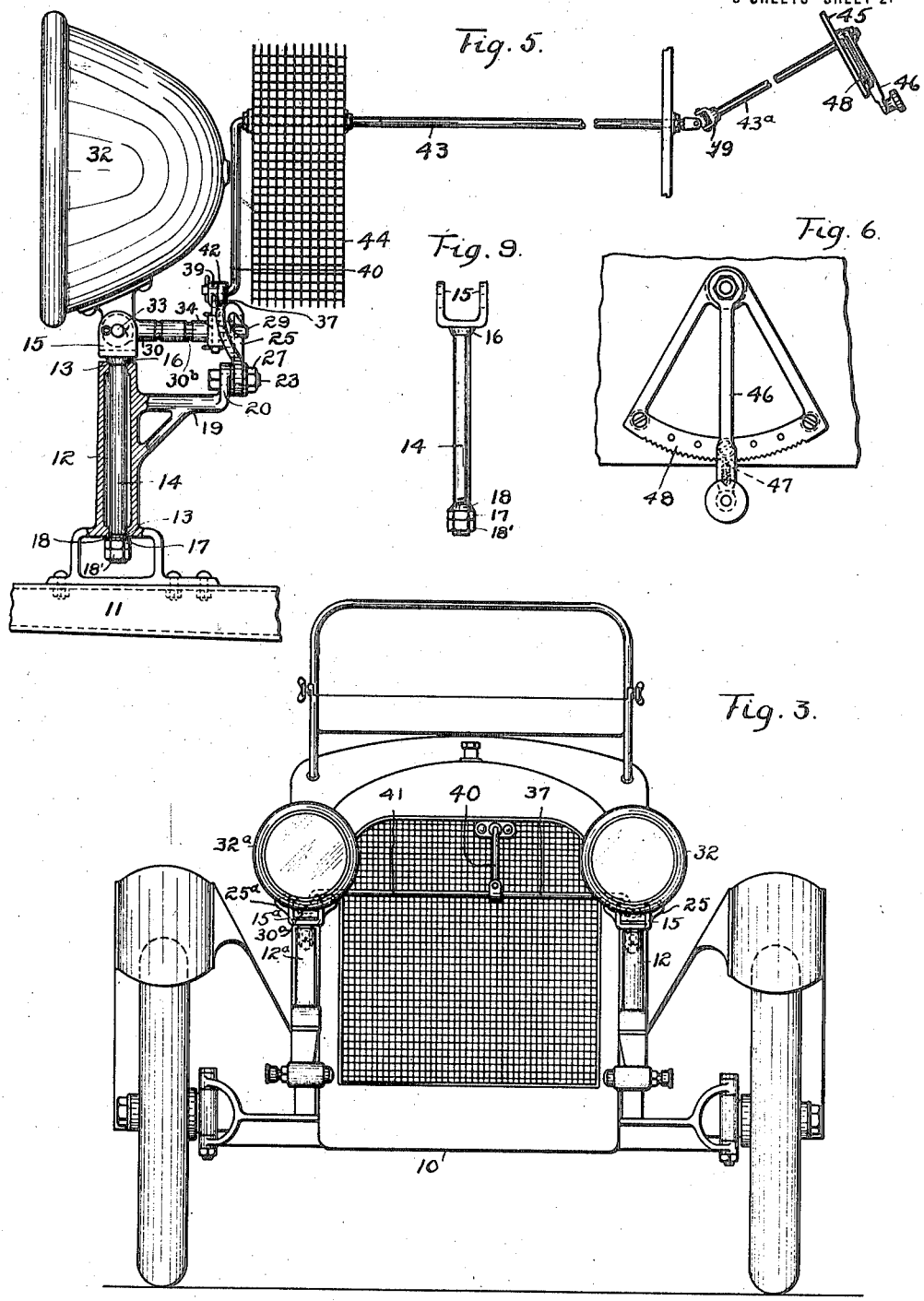
INVENTOR
F. G. Gauntt,
By
Elvin M. Hulse
ATTORNEY

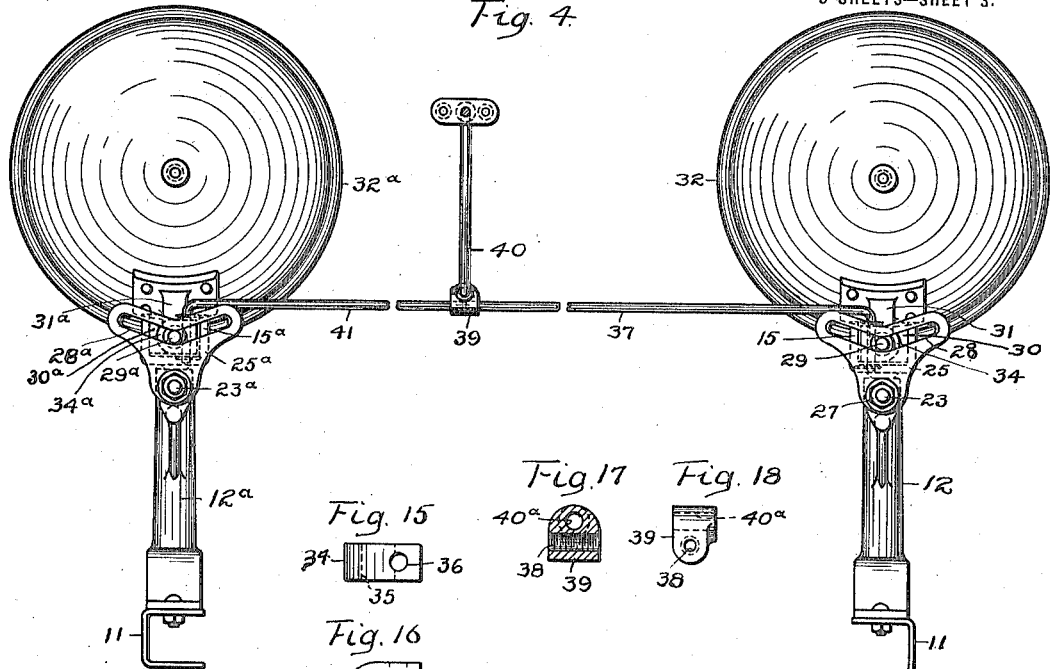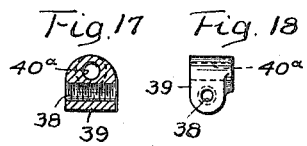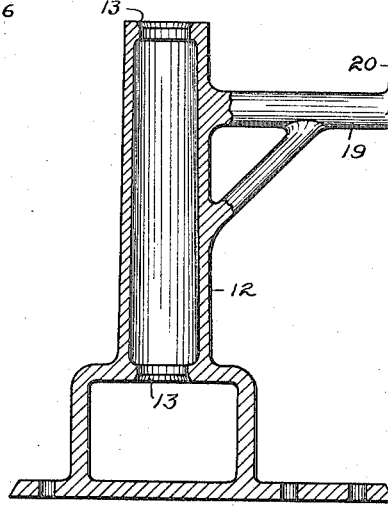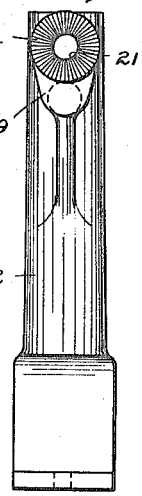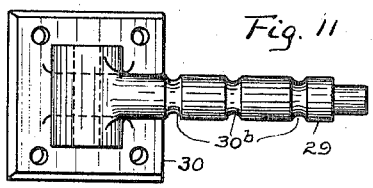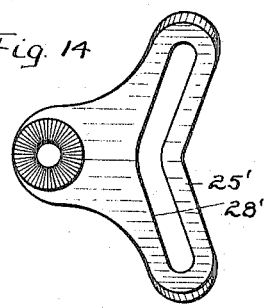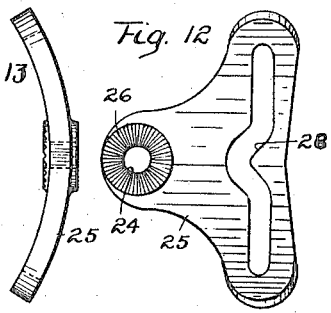

UNITED STATES PATENT OFFICE.

FOREST G. GAUNTT, OF FORT WAYNE, INDIANA.

MOTOR-VEHICLE HEADLIGHT.

1,393,278.     Specification of Letters Patent.     Patented Oct. 11, 1921.

Application filed December 13, 1919. Serial No. 345,713.

*To all whom it may concern:*

Be it known that I, FOREST G. GAUNTT, a citizen of the United States, residing at Fort Wayne, in the county of Allen and State of Indiana, have invented new and useful Improvements in Motor-Vehicle Headlights, of which the following is a specification.

The invention relates to mechanisms for adjusting the headlights of motor vehicles to control the direction of the beams of light therefrom at various angles with respect to the vehicle.

Headlights are usually rigidly secured to the vehicle so that their beams of light project forwardly at a fixed angle relatively to the vehicle, hence in turning a corner or rounding a curve the light beams do not continuously illuminate the roadway in front of the machine nor on the near side thereof but are directed to the far side of the road or into the fields or buildings adjoining the same. In passing an oncoming vehicle the present practice generally followed is to dim the lights so that the beams from the headlights will not blind the driver of the oncoming vehicle.

The object of my invention is to adjustably support the headlights on the vehicle so that their beams of light may be directed by the driver at various angles to the vehicle and thereby continuously illuminate the roadway immediately in front of the vehicle and any other part of the road he may choose, the controlling mechanism being operative by the driver of the vehicle from his seat.

In the accompanying drawings, I have illustrated the invention in simple form adapted to an automobile in which—

Figure 1:
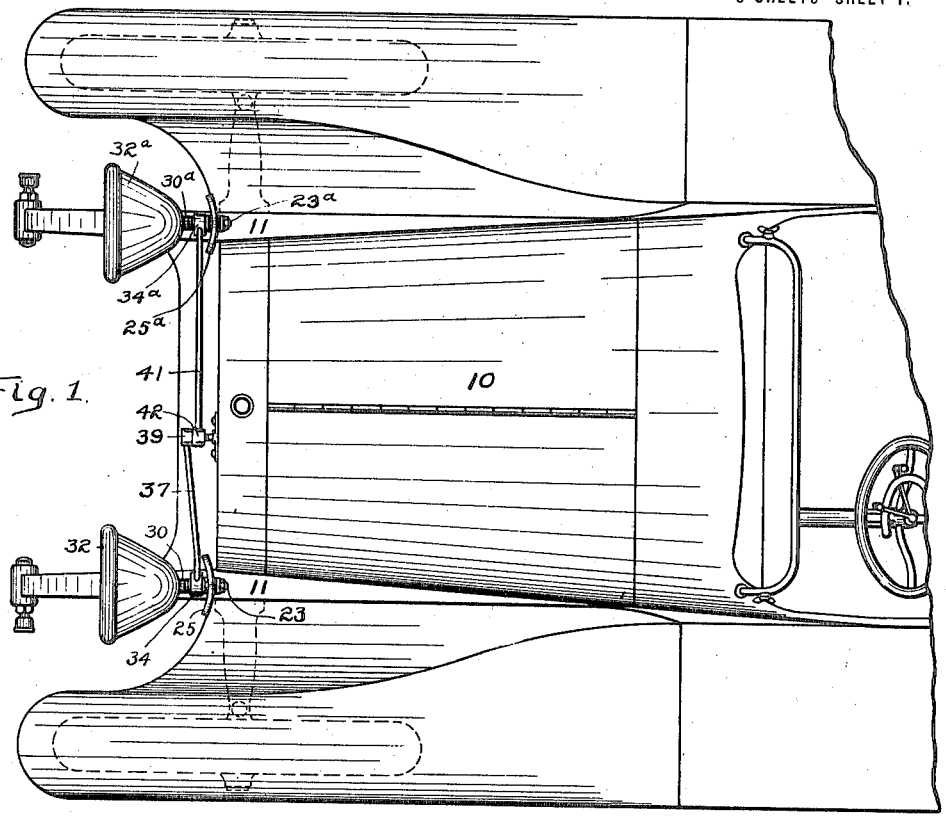
Figure 2:
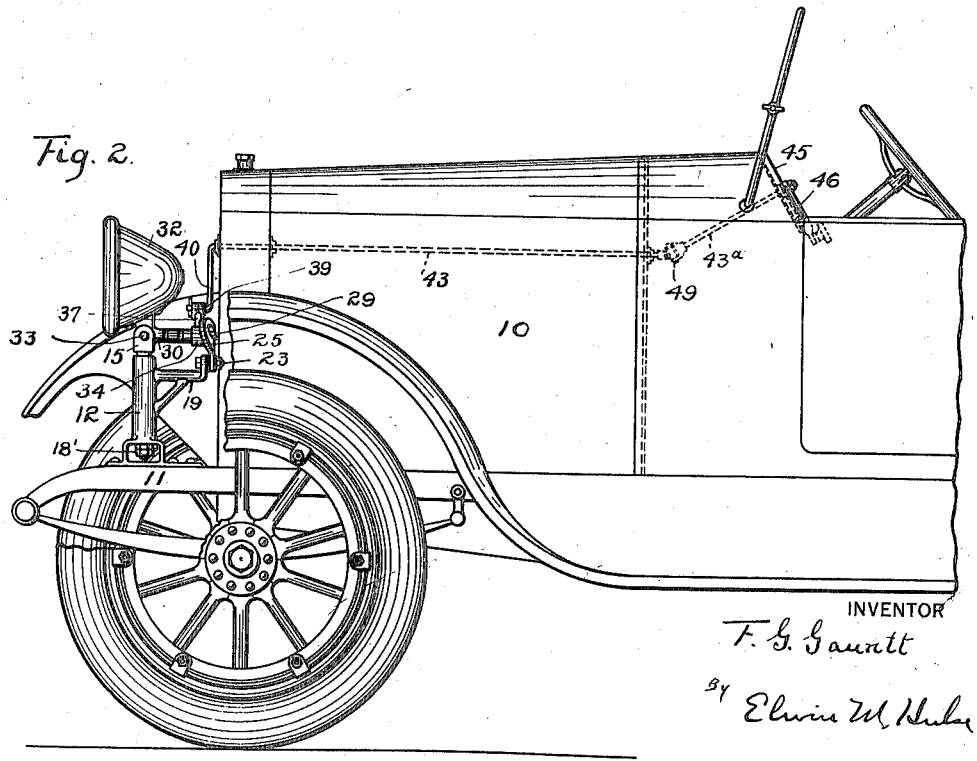

Figure 1 is a plan view of the forward portion of an automobile provided with the invention;

Fig. 2 a side elevational view of the same;

Fig. 3 a front elevational view of the same;

Fig. 4 a rear elevational view of the headlights and operating mechanism;

Fig. 5 a side elevational view of the headlights and operating mechanism partly in section;

Fig. 6 a front elevational view of the operating lever on the dash of the vehicle;

Fig. 7 a vertical cross-sectional view of the fixed support for the headlight;

Fig. 8 a rear elevational view of the same;

Fig. 9 an elevational view of the revoluble member of the headlight support;

Fig. 10 a side elevational view of the pivoted member of the headlight support;

Fig. 11 a bottom view of the same;

Fig. 12 a front elevational view of the guide plate;

Fig. 13 a plan view of the same;

Fig. 14 a front elevational view of a modified form of guide plate;

Fig. 15 a plan view of one of the swivel blocks for the pivoted members of the headlight supports;

Fig. 16 a side view of the same;

Fig. 17 a vertical longitudinal cross-section of one of the swivel blocks for the crank and Fig. 18 an end view of the same.

Referring to the drawings, 10 represents an automobile and 11 the side members of the chassis frame. The supports for headlights 32, 32ª are duplicates of each other, hence I shall describe but one the corresponding parts of the other being indicated on the drawing by similar reference characters with the addition of letter "a." The support consists of a cored member 12 suitably secured to member 11 of the chassis frame and having at its upper and lower ends cone-shaped bearings 13. A post 14 having bifurcations 15 at its upper end is revolubly supported in member 12, a cone-shaped portion 16 below the bifurcations being adapted to seat on upper bearing 13 and nut 17 threaded on the lower end of the post and having a cone-shaped portion 18 being adapted to seat on lower bearing 13, nut 18' on the post below nut 17 being adapted to lock nut 17 on the post in any adjusted position thereof. A bracket 19 projects rearwardly from the fixed member 12 and carries at its rear end an upstanding lug 20 having an aperture 21 therein, the rear face 22 of the lug about the aperture being roughened or corrugated or fluted. Bolt 23 is introduced through aperture 21 and through aperture 24 formed in guide plate 25 adjustably supported on the bolt and having its forward face 26 about aperture 24 roughened or otherwise prepared to engage the corresponding face 22 of lug 20. Nut 27 on the bolt, when tightened, holds the plate in tight engagement with the lug in any peripheral position on the bolt to which the plate may be adjusted. A slot 28 is formed in the plate in suitable manner and having a suitable shape to perform the functions about to be described. Arm 29 of member 30 projects at its outer end into slot 28 and upper arm 31 of the member is suitably formed at its upper end to be secured to headlight 32, the member being pivoted at 33 between bifurcations 15 on post 14. Since the headlight is secured to the pivoted member 30, and that member is supported on revoluble member or post 14 the headlight may be tilted or rotated in a vertical plane and also swung or rotated in a horizontal plane on member 12. Slot 28 in plate 25 preferably rises rapidly in opposite directions from its lowest point and from the upper ends of the rising portions the slot extends horizontally to the opposite ends of the plate. Consequently as the headlight is swung laterally member 29 is caused to rise quickly to tilt the headlight downwardly to cause its beam of light to be directed on the roadway in front of the vehicle, the further movement of the headlight being lateral. In Fig. 14 the slot 28' in plate 25' rises uniformly from its lowest point to its opposite ends so that the headlight will be caused to tilt gradually as it is swung laterally. For most uses, however, it will be preferable that the headlight shall be tilted quickly at the beginning of the lateral movement of the same hence any suitable form of slot which will control the tilting movement of the headlight at the desired point of time will suffice.

In order that the headlights may be swung in a horizontal plane simultaneously, I provide on arm 29 of each member 30, 30ª a series of peripheral grooves 30ᵇ. A swivel block 34 having an aperture 35 is supported on arm 29, the arm projecting through the aperture. An aperture 36 is also formed in the block which intersects aperture 35 in the side portion of the latter. The outer end of rod 37 is adapted to be inserted into aperture 36 and when the block is in proper position over any one of the grooves 30ᵇ the rod also engages in said groove to retain the block at the selected point on arm 29 but without interfering with the peripheral movement of the block thereon. The opposite or inner end of the rod 37 is threaded into aperture 38 formed in block 39 having aperture 40ª into which is introduced the end of crank 40 and upon which crank the block may swivel. A block 42 similar to block 39 is similarly mounted on the crank and similarly connected to rod 41, the outer end of the latter rod being engaged in swivel block 34ª mounted on the pivotal member 30ª attached to headlight 32ª in a manner similar to the mounting of swivel block 34 on arm 29 of member 30. Crank 40 is carried by shaft 43 extending through radiator 44 of the cooling system of the engine and under the hood to and through the dash 45 of the vehicle. A lever 46 is secured to the rear projecting end of the shaft and carries a spring opposed pawl 47 which coöperates with a quadrant rack 48 suitably secured to the dash and by which the lever may be locked in any position to which it may be rocked. In Figs. 2 and 5 I show the shaft formed in two sections 43 and 43ª connected by universal joint 49, said form being used where the hood and dash will not permit the shaft to be formed in one piece.

To illustrate the operation of the mechanism and assuming that the driver desires to turn the headlights to the right, he will, from his seat, swing lever 46 to the left to rock shaft 43 to the right and rock crank 40 to the left thus pulling rod 41 and pushing rod 37 to the left. This movement of the rods causes the pivoted members 30, 30ª to rotate the headlights to the right. The guide slots in plates 25, 25ª cause the arms 29 of the pivoted members 30, 30ª to elevate at the selected time—according to the location of the rising portions of the slots in said plates. Hence the members 30, 30ª and the headlights secured thereto are rotated or tilted downwardly simultaneously and at the same time swung laterally on their supports, the tilting movement being controlled by the guide plates and the swinging movement being accomplished by the crank and its connections to the headlight pivotal supports, the point in the lateral movement of the headlights at which the headlights shall tilt being governed by the location of the rising portions of the slot.

In order that the driver of the vehicle may arrange the headlights so that one of them may swing farther than the other he will disconnect the rod 37 or 41 from arm 29 of the pivoted member 30 or 30ª of the headlight desired to be moved the greater distance, move the swivel block on said arm to an annular groove 30ᵇ nearer the pivotal point of said member 30 or 30ª and again insert the end of the rod in the block.

It is apparent that the less the distance between the point of connection of the connecting rod to arm 29 of the pivoted member and the pivotal point of that member the greater will be the travel of arm 29 and the greater will be the swinging movement of the headlight. The normal position of the swivel blocks 34, 34ᵃ is over the outermost annular groove 30ᵇ in the arm 29 of the pivoted members 30, 30ᵃ hence any change in the position of a swivel block on either arm will increase the travel of the arm 29 and consequently the length of the arc through which the headlight will be turned will also be increased. In this manner the left hand headlight may be adjusted so that it will be moved sufficiently to direct its rays out of the face of the driver of an oncoming vehicle while the other headlight will be moved to direct its rays into the ditch or along the side of the road, both headlights illuminating the roadway in front of the vehicle. The degree of tilt of either headlight is controlled by adjusting the corresponding guide plate on its support. If it is desired to cause a headlight, when rotated to the left (Fig. 3), to tilt more than it is caused to tilt when the plate is in normal position, the guide plate will be rotated to the right the desired degree so that as the headlight is turned it will also tilt the desired extent. Of course, if the headlight is turned to the right (Fig. 3) its tilt will be less than where the guide plate is in normal position. The invention is equally applicable to a single head light.

What I claim is:

1. The combination with a vehicle, of a headlight pivotally supported on the vehicle, means to tilt the headlight and being adapted to control the direction of said tilting movement and means to rotate the headlight laterally having an adjustable connection to the headlight for controlling the extent of travel of the headlight in all said movements.

2. The combination with a vehicle, of a headlight pivotally supported on the vehicle, means to rotate the headlight laterally and adjustably fixed means engaging the headlight to cause the headlight to tilt in a controlled direction as the same is rotated, the said means to rotate the headlight having an adjustable connection to the same for controlling the extent of travel of the headlight in all directions.

3. The combination with a vehicle, of a headlight pivotally supported on the vehicle, a rocking member, means operative at the dash for swinging the rocking member, a reciprocable member pivotally connected to the rocking member and the headlight for rotating the headlight laterally, a member engaging the headlight for causing the headlight to tilt simultaneously with its rotation and being adjustable to control the direction of said tilting movement, the pivotal connection between the reciprocable member and headlight being adjustable to control the travel of the headlight in all said movements, and means to lock the headlight in all positions to which it may be moved.

4. The combination with a vehicle, of a plurality of headlights pivotally supported on the vehicle, means having connection with the headlights for rotating them simultaneously laterally, and means having connection with each headlight for tilting the same as it is rotated, the first named means being adjustable to control the extent of travel of each headlight in all directions independently of the other headlight.

5. The combination with a vehicle, of a plurality of headlights pivotally supported on the vehicle, means having connection with the headlights for rotating them simultaneously laterally, and means having connection with each headlight for causing the same to tilt as it is rotated and being adjustable to control the direction of said tilting movement independently of the other headlight.

6. The combination with a vehicle, of a plurality of headlights pivotally supported on the vehicle, means having connection with the headlights for rotating them simultaneously laterally and means having connection with each headlight for causing it to tilt simultaneously with its rotation and being adjustable to control the direction of said tilting movement independently of the tilting movement of the other headlight, the first named means being adjustable to control the extent of travel of the headlights in all directions independently of each other.

7. The combination with a vehicle, of a plurality of headlights, a support for each headlight comprising a fixed member, a member revolubly supported on the fixed member and a member secured to the headlight and pivoted to the revoluble member, a rocking member, means adjustably connecting the rocking member to each pivoted member and adjustable means engaging the pivoted members for causing the headlights to tilt in vertical planes when the rocking member is moved.

8. The combination with a vehicle, of a plurality of headlights, a support for each headlight comprising a fixed member, a member revolubly supported on the fixed member and a member pivoted to the revoluble member and secured to the headlight, means secured to each fixed support and engaging the pivoted member thereon for causing the said member and the headlight secured thereto to tilt in a vertical plane, a crank and means to rock the same, rods connected to the crank and adjustably connected to the pivoted members respectively for simultaneously rotating the said members and the headlights in a horizontal plane, said latter means including an operating lever at the dash of the vehicle.

9. The combination with a vehicle, of a plurality of headlights, a support for each headlight comprising a fixed member, a member revolubly supported by the fixed member, a member pivotally mounted on the revoluble member and secured to the headlight and a slotted plate adjustably mounted on the fixed member and engaging the pivoted member and adapted to cause the pivoted member and the headlight to tilt in a vertical plane, and means connected to the pivoted members for simultaneously rotating the same and the headlights in a horizontal plane.

In witness whereof I have hereunto set my hand this 15th day of December, 1919.

FOREST G. GAUNTT.